United States Patent
Ballantyne

(10) Patent No.: US 12,254,302 B2
(45) Date of Patent: Mar. 18, 2025

(54) IDENTIFYING BINARY OBJECTS USING SIGNATURE OF INPUT ITEMS USED TO CREATE BINARY OBJECT

(71) Applicant: Dell Products L.P., Round Rock, TX (US)

(72) Inventor: Robert A. Ballantyne, Mansfield, MA (US)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 17/487,583

(22) Filed: Sep. 28, 2021

(65) Prior Publication Data
US 2023/0101397 A1    Mar. 30, 2023

(51) Int. Cl.
*G06F 8/61*    (2018.01)
*G06F 9/455*    (2018.01)
*G06F 21/64*    (2013.01)

(52) U.S. Cl.
CPC .............. *G06F 8/63* (2013.01); *G06F 9/45558* (2013.01); *G06F 21/64* (2013.01); *G06F 2009/45562* (2013.01)

(58) Field of Classification Search
CPC ........ G06F 8/63; G06F 9/45558; G06F 21/64; G06F 2009/45562
See application file for complete search history.

(56) References Cited

U.S. PATENT DOCUMENTS

| 9,661,009 B1* | 5/2017 | Karandikar ......... H04L 63/1408 |
| 9,959,100 B2* | 5/2018 | Straub ....................... G06F 8/31 |
| 9,973,531 B1* | 5/2018 | Thioux ............... H04L 63/1466 |

(Continued)

FOREIGN PATENT DOCUMENTS

| CN | 102200714 B * | 7/2014 | ......... G03G 15/0863 |
| CN | 112486523 A * | 3/2021 | |
| WO | WO-2023039757 A1 * | 3/2023 | ............... G06F 8/63 |

OTHER PUBLICATIONS

Haq et al., "A Survey of Binary Code Similarity", Apr. 2021, ACM vol. 54, No. 3, Article 51 (Year: 2021).*

(Continued)

*Primary Examiner* — Wei Y Zhen
*Assistant Examiner* — Junchun Wu
(74) *Attorney, Agent, or Firm* — Ryan, Mason & Lewis, LLP

(57) ABSTRACT

Techniques are provided for identifying a binary object using a signature of the input items used to create the binary object. One method comprises obtaining one or more input items; generating a signature of the one or more input items; transforming the one or more input items to generate a binary object; associating the signature with the binary object; and providing the binary object with the associated signature to a repository, wherein the signature is processed to evaluate the one or more input items used to create the binary object. The signature can be compared to an additional signature of one or more additional input items to determine whether transform the one or more additional input items to generate an additional binary object. The signature can be included in, for example, metadata embedded in the binary object, file properties associated with the binary object and/or a file name or tag of the binary object.

20 Claims, 7 Drawing Sheets

(56) References Cited

U.S. PATENT DOCUMENTS

| | | | |
|---|---|---|---|
| 10,002,247 B2* | 6/2018 | Suarez | G06F 21/31 |
| 11,316,733 B1* | 4/2022 | Johnson | H04L 41/0813 |
| 2009/0049430 A1* | 2/2009 | Pai | G06F 9/44589 |
| | | | 717/140 |
| 2016/0335110 A1* | 11/2016 | Paithane | H04L 63/145 |
| 2017/0024158 A1* | 1/2017 | Brkic | G09G 5/393 |
| 2018/0115585 A1* | 4/2018 | Rubakha | G06F 21/53 |
| 2018/0165157 A1* | 6/2018 | Olinsky | G06F 11/1433 |
| 2019/0095622 A1* | 3/2019 | Brumlow | H04L 41/08 |
| 2020/0042465 A1* | 2/2020 | Duval | G06F 3/0622 |
| 2020/0210445 A1* | 7/2020 | Sherman | G06F 16/26 |
| 2020/0301697 A1* | 9/2020 | Oh | G06F 21/51 |
| 2021/0200814 A1* | 7/2021 | Tal | G06F 16/90335 |
| 2022/0038266 A1* | 2/2022 | Duval | G06F 21/79 |
| 2022/0198563 A1* | 6/2022 | Kaplan | G06F 21/57 |
| 2022/0366086 A1* | 11/2022 | Nouard | G06F 21/64 |

OTHER PUBLICATIONS

Conti et al., "Automated mapping of large binary objects using primitive fragment type classification", Aug. 2010, Elsevier (Year: 2010).*

Alhanahnah et al., "Efficient Signature Generation for Classifying Cross-Architecture IoT Malware", 2018, IEEE (Year: 2018).*

Zhu et al., "Signature Detection and Matching for Document Image Retrieval", Nov. 2009, vol. 31, No. 11 (Year: 2009).*

Mark Roberts, "Signing and Verifying Container Images", Mar. 10, 2021, https://cloud.redhat.com/blog/signing-and-verifying-container-images; downloaded on Sep. 24, 2021.

Content Trust in Docker; https://docs.docker.com/engine/security/trust/; downloaded on Sep. 24, 2021.

"Container Image Signatures", https://docs.openshift.com/container-platform/4.7/security/container_security/security-container-signature.html; downloaded on Sep. 24, 2021.

* cited by examiner

300

(1) OBTAIN INPUT ITEMS;
(2) CALCULATE HASH VALUE OF THE INPUT ITEMS;
(3) INSPECT LOCAL IMAGES (E.G., USING DOCKER "INSPECT" COMMAND) TO DETERMINE IF AN EXISTING LOCAL IMAGE COMPRISES THE CALCULATED HASH VALUE IN THE METADATA OF THE LOCAL IMAGE
- IF A MATCH IS FOUND: THE EXISTING LOCAL IMAGE CAN BE RENAMED, IF NEEDED, AND USED TO REPRESENT THE DESIRED OUTPUT AND END PROCESSING, OTHERWISE CONTINUE TO STEP (4);
(4) REQUEST AN IMAGE FROM THE CONTAINER REGISTRY HAVING THE CALCULATED HASH VALUE IN THE NAME AND/OR METADATA OF THE IMAGE FROM THE CONTAINER REGISTRY
- IF A MATCH IS FOUND: THE IMAGE FROM THE CONTAINER REGISTRY IS DOWNLOADED FROM THE CONTAINER REPOSITORY AND RENAMED, IF NEEDED, AND END PROCESSING, OTHERWISE CONTINUE TO STEP (5);
(5) BUILD A NEW IMAGE USING THE OBTAINED INPUT ITEMS; AND
(6) PUSH THE NEW IMAGE TO THE CONTAINER REGISTRY WITH THE CALCULATED HASH VALUE IN THE NAME AND/OR METADATA OF THE NEW IMAGE

IDENTIFYING BINARY OBJECTS USING SIGNATURE OF INPUT ITEMS USED TO CREATE BINARY OBJECT

FIELD

The field relates generally to information processing techniques and more particularly, to the protection of data in such information processing systems.

BACKGROUND

Containers comprise software that can be used to deploy software applications. Among other benefits, containers allow software to execute reliably in different computing environments. A container is typically generated from a container image. A container image and other binary objects are generated by applying one or more transformations to a set of input items. A container image, for example, is typically generated from application code and other input items.

A need exists for improved techniques for identifying binary objects generated from a set of input items.

SUMMARY

In one embodiment, a method comprises obtaining one or more input items; generating a signature of the one or more input items; transforming the one or more input items to generate a binary object; associating the signature with the binary object; and providing the binary object with the associated signature to a repository, wherein the signature is processed to evaluate the one or more input items used to create the binary object. The signature can be compared to an additional signature of one or more additional input items to determine whether to transform the one or more additional input items to generate an additional binary object.

In some embodiments, the signature is associated with the binary object by including the signature in: (i) metadata embedded in the binary object, (ii) file properties associated with the binary object, and/or (iii) a file name and/or a tag of the binary object. The signature can be associated with the binary object when the binary object is created and/or when the binary object is stored in the repository.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for a signature-based binary object identification process, according to one embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for identifying binary objects using a signature of the input items used to create each binary object, such as container images.

The amount of time required to build a container image can be significant. In addition, depending on the size of the resulting container image and the speed of the connection between the device where the container image is generated and the container repository where the container image is stored, the time to upload or download a container image can be significant. A need remains for techniques for suppressing the generation of a binary object (sometimes referred to as build avoidance) or the upload/download of a binary object (sometimes referred to as upload/download avoidance) when the binary object has already been generated from the same input items (or uploaded or downloaded).

In one or more embodiments, techniques are provided for identifying binary objects using a signature of the input items used to create each binary object. The disclosed signature-based techniques, in at least some embodiments, associate the signature of the input items used to create each binary object with the binary object (e.g., by embedding the signature in the binary object). In this manner, the disclosed techniques for signature-based identification of binary objects allow a suppression of the generation of a binary object when the associated signature of the input items reveals that the binary object has already been generated from the same input items.

Among other benefits, the disclosed signature-based binary object identification techniques allow the generation of a binary object and/or the uploading/downloading of a binary object to be suppressed or avoided when the associated signature of the input items reveals that the binary object is already available from the same input items.

While one or more embodiments of the disclosure are illustrated in the context of identifying container images using a signature of the input items used to create each container image, the disclosed signature-based identification techniques can be used to identify any binary object generated from a set of input items, as would be apparent to a person of ordinary skill in the art.

Figure 1:
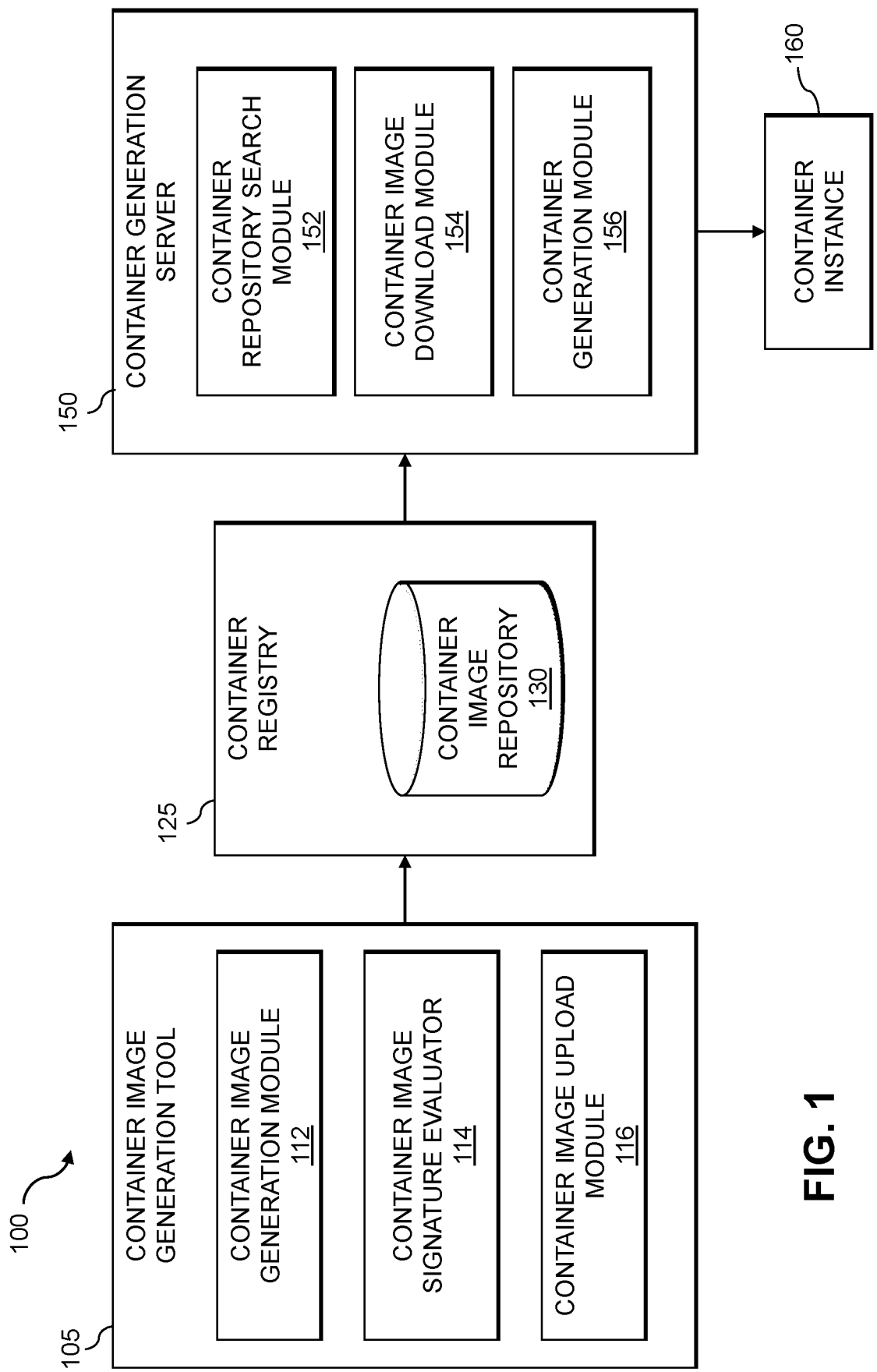
FIG. 1 illustrates an information processing system configured for identifying binary objects using a signature of the input items used to create each binary object in accordance with an illustrative embodiment.

FIG. 1 shows an information processing system 100 configured in accordance with an illustrative embodiment. The information processing system 100 comprises a container image generation tool 105, a container registry 125 and a container generation server 150. In the example of FIG. 1, the container image generation tool 105 may be used to generate a container image configured to execute in a container instance 160. The container image generation tool 105 may upload the generated container image to the container registry 125, for example, for storage in a container image repository 130. The container image may be served from the container registry 125 to the container instance 160, in some embodiments, using the container generation server 150. The term "binary object," as used herein, is intended to be broadly construed, so as to encompass, for example, any binary object generated by applying a transformation to a set of input items, such as a container image generated using one or more computer files corresponding to one or more software applications that execute in a software container. A container image and other binary objects may also comprise metadata and/or file properties.

The container image generation tool 105 may be implemented, for example, as a user device, such as a host device and/or another device such as a mobile telephone, a laptop computer, a tablet computer, a desktop computer or another type of computing device. Such devices are examples of what are more generally referred to herein as "processing devices." Some of these processing devices are also generally referred to herein as "computers." When the container image generation tool 105 is implemented as a host device, the host device may illustratively comprise one or more servers or other types of computers of an enterprise computer system, cloud-based computer system or other arrangement of multiple compute nodes associated with respective users.

One or more of the container image generation tool 105, the container registry 125 and the container generation server 150 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the container image generation tool 105, the container registry 125 and the container generation server 150 illustratively comprises processing devices of one or more processing platforms. For example, the container image generation tool 105 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the container image generation tool 105, the container registry 125 and the container generation server 150 can additionally or alternatively be part of cloud infrastructure such as an Amazon Web Services (AWS) system. Other examples of cloud-based systems that can be used to provide at least portions of the container image generation tool 105, the container registry 125 and/or the container generation server 150 include Google Cloud Platform (GCP) and Microsoft Azure.

As shown in FIG. 1, the exemplary container image generation tool 105 comprises a container image generation module 112, a container image signature evaluator 114 and a container image upload module 116, as discussed further below in conjunction with FIGS. 2 through 4. In one or more embodiments, the container image generation module 112 may be used by a user to generate a container image. The container image signature evaluator 114 evaluates a signature of the inputs used to generate a given container image to determine, for example, if the container image needs to be generated. The exemplary container image upload module 116 coordinates with the container registry 125 to upload generated container images to the container image repository 130.

It is to be appreciated that this particular arrangement of modules 112, 114, 116 illustrated in the container image generation tool 105 of the FIG. 1 embodiment is presented by way of example only, and alternative arrangements can be used in other embodiments. For example, the functionality associated with modules 112, 114, 116 in other embodiments can be combined into a single module, or separated across a larger number of modules. As another example, multiple distinct processors and/or memory elements can be used to implement different ones of modules 112, 114, 116 or portions thereof. At least portions of modules 112, 114, 116 may be implemented at least in part in the form of software that is stored in memory and executed by a processor.

As shown in FIG. 1, the exemplary container generation server 150 comprises a container repository search module 152, a container image download module 154 and a container generation module 156, as discussed further below in conjunction with FIGS. 3 and 4. In one or more embodiments, the container repository search module 152 allows a user to search the container image repository 130 to obtain desired container images. The container image download module 154 coordinates with the container registry 125 to download desired container images from the container image repository 130 for the creation of container instances 160. The exemplary container generation module 156 creates container instances 160 from container images obtained from the container image repository 130.

It is to be appreciated that this particular arrangement of modules 152, 154, 156 illustrated in the container generation server 150 of the FIG. 1 embodiment is presented by way of example only, and alternative arrangements can be used in other embodiments. For example, the functionality associated with modules 152, 154, 156 in other embodiments can be combined into a single module, or separated across a larger number of modules. As another example, multiple distinct processors and/or memory elements can be used to implement different ones of modules 152, 154, 156 or portions thereof. At least portions of modules 152, 154, 156 may be implemented at least in part in the form of software that is stored in memory and executed by a processor.

The container image generation tool 105 and/or the container generation server 150 may further include one or more additional modules and other components typically found in conventional implementations of such devices, although such additional modules and other components are omitted from the figure for clarity and simplicity of illustration.

One or more of the container image generation tool 105, the container registry 125 and the container generation server 150 in the FIG. 1 embodiment may be implemented on a common processing platform, or on separate processing platforms. In the FIG. 1 embodiment, the container image generation tool 105, the container registry 125 and the container generation server 150 are assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for one or more of the container image generation tool 105, the container registry 125 and the container generation server 150 to reside in different data centers. Numerous other distributed implementations of the components of the system 100 are possible.

As noted above, the container registry 125 can have an associated container image repository 130 configured to store one or more container images. Although the container images are stored in the example of FIG. 1 in a single container image repository 130, in other embodiments, an additional or alternative instance of the container image repository 130, or portions thereof, may be incorporated into the container registry 125 or other portions of the system 100.

The container image repository 130 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the container image generation tool 105, the container registry 125 and/or the container generation server 150 can be one or more input/output devices (not shown), which illustratively comprise keyboards, displays or other types of input/output devices in any combination. Such input/output devices can be used, for example, to support one or more user interfaces to a user device, as well as to support communication between the container image generation tool 105, the container registry 125, the container generation server 150 and/or other related systems and devices not explicitly shown.

In some embodiments, the container registry 125 can be implemented using the Docker Container Registry, the interface to the container image generation tool 105 can be implemented using the Docker command line interface and the interface to the container registry 125 can be implemented using the Docker registry interface (e.g., Docker Registry HTTP API V2). The Docker Container Registry comprises an object store. Thus, only one copy of a container image is typically saved in a docker registry, regardless of the names or tags given to a container image. When a docker image is uploaded to a registry, the uploaded docker image is given a hash identifier value (known as a repository digest) for the uploaded image. The hash identifier value of the image excludes metadata about the image in the registry. When a differently named (or differently tagged) imaged is uploaded to the same registry, the new image is typically only saved if it has a unique hash identifier value in that registry. Docker registries typically only support searches for container images by an image name, a tag and/or a repository digest.

In one or more embodiments, the signature of the input items of a container image is placed into a label field in the metadata of the container image, and also in the tag field of the image in the registry. In this manner, the signature can be used in local searches to determine if the required container image has already been generated and renamed or retagged. In addition, the signature can be used when uploaded to the container registry 125. In at least some embodiments, the container registry 125 is an object repository. Thus, only one copy of the image is saved in the container registry 125, but by saving the container image with a tag representing the signature of the input items, the container registry 125 automatically provides access when this is requested.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for signature-based identification of binary objects is presented by way of illustrative example only, and in other embodiments additional or alternative elements may be used. Thus, another embodiment includes additional or alternative systems, devices and other network entities, as well as different arrangements of modules and other components.

Figure 2:
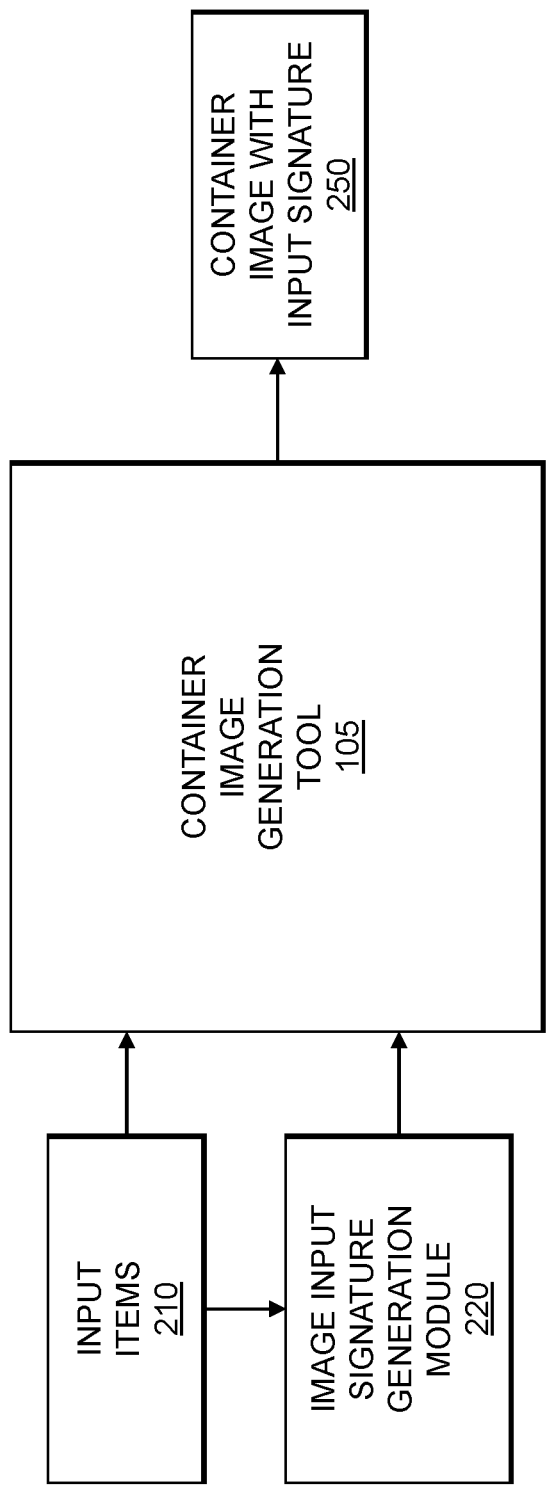
FIG. 2 illustrates the container image generation tool of FIG. 1 in further detail according to one or more embodiments.

FIG. 2 illustrates the container image generation tool 105 of FIG. 1 in further detail according to one or more embodiments. In the example of FIG. 2, the exemplary container image generation tool 105 processes one or more input items 210 to generate a container image 250, for example, by transforming the one or more input items 210 into the container image 250. The one or more input items 210 may comprise, for example, one or more source files and a hash value (e.g., a git subtree hash value) or another transformation or source file-dependent value that identifies (e.g., uniquely describe) the one or more source files associated with the container image 250. In addition, the one or more input items 210 may comprise one or more of parameters, arguments, environmental variables and configuration settings.

An image input signature generation module 220 processes one or more input items 210 to generate a signature that identifies the one or more input items 210. The signature may comprise, for example, a hash value (e.g., a SHA256 hash value), a checksum value or another transformation applied to the one or more input items 210 to substantially uniquely identify the one or more input items 210 (e.g., using a value that depends on the one or more input items 210), as would be apparent to a person of ordinary skill in the art.

The exemplary container image generation tool 105 processes the one or more input items 210 and the signature of the one or more input items 210 generated by the image input signature generation module 220 to generate the container image 250. The generated container image 250 also comprises (or is associated with) the signature generated by the image input signature generation module 220.

FIG. 3 illustrates exemplary pseudo code for a signature-based binary object identification process 300, according to one embodiment of the disclosure. As noted above, in one or more embodiments, a signature is generated of the input items 210 used to create a given container image 250. The signature can be compared to signature values of other container images that were previously generated to determine whether to generate and/or upload the given container image. The hash value is associated with the created container image (e.g., embedded in metadata, file properties and/or as a tag field of the file name of the created container image). The hash value can be associated with the created container image at the time that the container image is created or at the time that the container image is uploaded to the container registry 125.

In the example of FIG. 3, the pseudo code for the signature-based binary object identification process 300 comprises the following steps:

(1) obtain input items;
(2) calculate hash value of the input items;
(3) inspect local images (e.g., using docker "inspect" command) to determine if any existing local image comprises the calculated hash value in the metadata of the local image. If a match is found: the existing local image can be renamed, if needed, and used to represent the desired output, otherwise continue to step (4);
(4) request an image from the container registry 125 having the calculated hash value in the name and/or metadata of the image from the container registry 125. If a match is found: the image from the container registry 125 is downloaded from the container image repository 130 and renamed, if needed, otherwise continue to step (5);
(5) build a new image using the obtained input items; and
(6) push the new image to the container registry 125 with the calculated hash value in the name and/or in the metadata of the new image.

Figure 4:
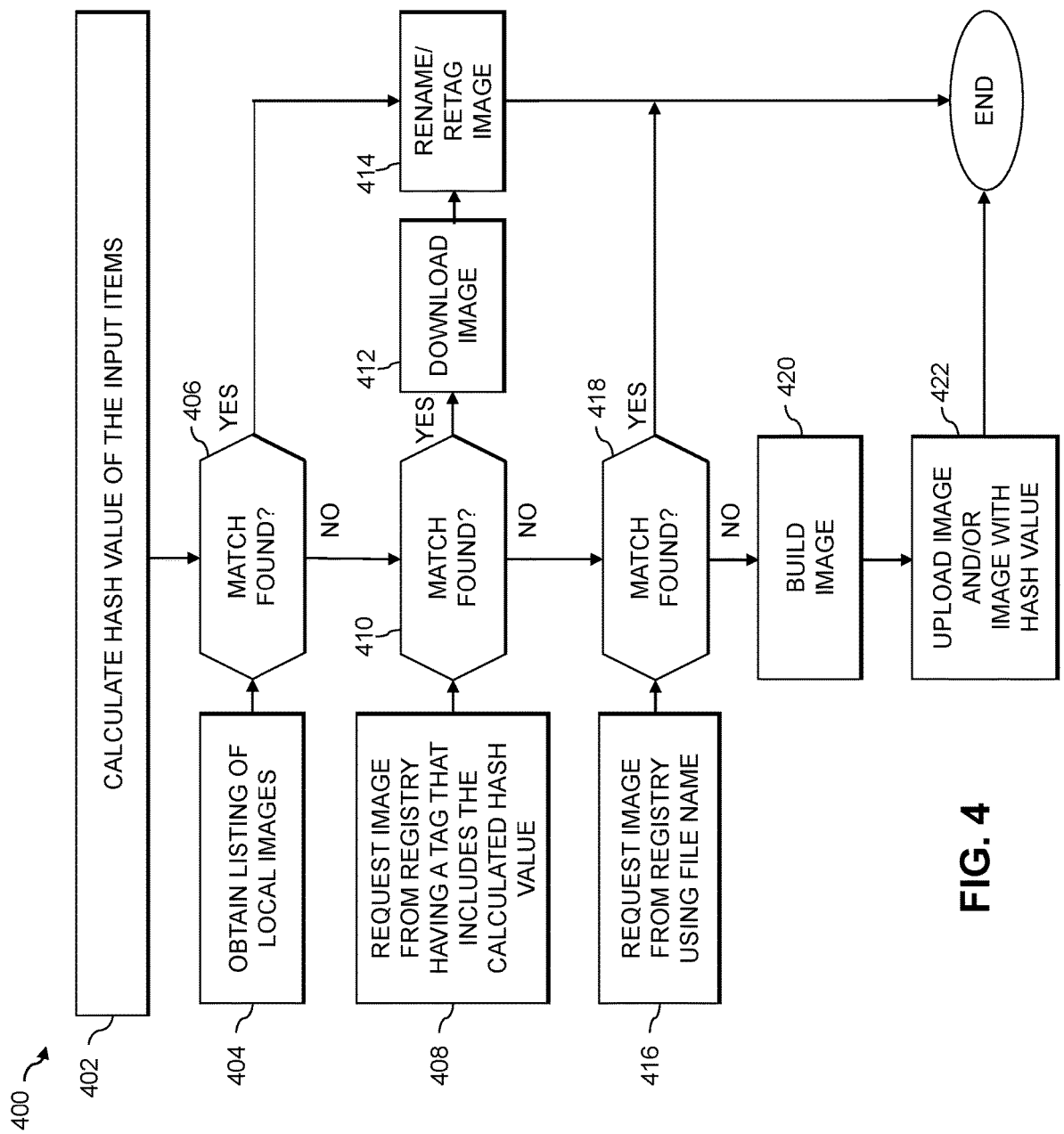
FIG. 4 is a flow diagram illustrating an exemplary implementation of a signature-based binary object generation and identification process, according to various embodiments.

FIG. 4 is a flow diagram illustrating an exemplary implementation of a signature-based binary object generation and identification process 400, according to various embodiments. In the example of FIG. 4, the hash value of the input items 210 is initially calculated in step 402. In step 406, the process 400 compares the hash value of the input items calculated in step 402 to hash values of existing local images in a listing obtained in step 404. If a match is found in step 406, program control proceeds to step 414, discussed below.

In step 410, the process 400 compares the hash value of the input items calculated in step 402 to hash values of one or more existing images in the container registry 125 obtained in step 408 by requesting an image from the container registry 125 having a tag that includes the hash value calculated in step 402, in accordance with the disclosed signature-based binary object identification techniques. It is noted that step 408 is performed, at least in some embodiments, only when the match operation is performed in step 410 (e.g., only if a match is not found in step 406). If a match is found in step 410, the matching image is downloaded in step 412 and the image is renamed and/or retagged, if needed, in step 414. Program control then terminates.

Step 418 compares the hash value of the input items calculated in step 402 to hash values obtained from requesting an image in step 416 from the container registry 125 using a file name, in a conventional manner. It is noted that step 416 is performed, at least in some embodiments, only when the match operation is performed in step 418 (e.g., only if a match is not found in step 410). If a match is found in step 416, then program control terminates.

If a match is not found in step 418, then the desired container image is not available in the local images, or in the container registry 125. Thus, the container image is built in step 420, and the generated container image and/or the generated container image with the hash value is uploaded in step 422, before program control terminates. For example, two versions of the generated container image may be uploaded (e.g., a first version comprising a conventional representation of the container image and a second version comprising the container image with the calculated hash value). The second version comprising the container image with the calculated hash value allows searching of the container registry 125 for the container image using the calculated. hash value.

Figure 5:
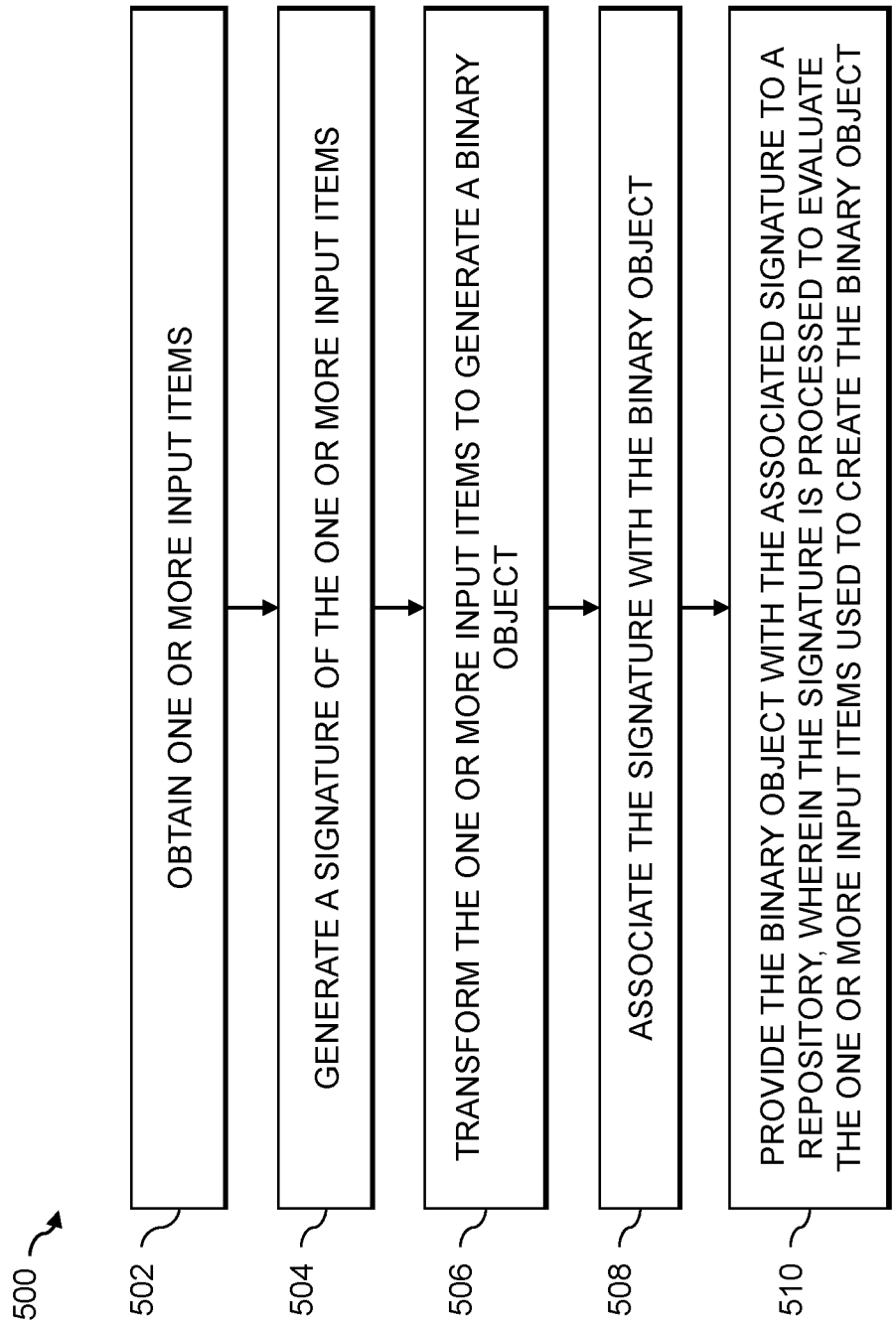
FIG. 5 is a flow diagram illustrating an exemplary implementation of a signature-based process for identifying binary objects, according to various embodiments.

FIG. 5 is a flow diagram illustrating an exemplary implementation of a signature-based process 500 for identifying binary objects, according to various embodiments. In the example of FIG. 5, the signature-based process 500 obtains one or more input items in step 502 and generates a signature of the one or more input items in step 504.

The signature-based process 500 then transforms the one or more input items to generate a binary object in step 506 and associates the signature with the binary object in step 508. The transformation of the one or more input items to generate the binary object may comprise, for example, generating a first container image using the one or more input items.

The binary object is provided with the associated signature to a repository in step 510, where the signature is processed to evaluate the one or more input items used to create the binary object.

The signature generated in step 504 may be compared to an additional signature of one or more additional input items to determine whether to perform the transforming in step 506 of the one or more additional input items to generate an additional binary object.

The signature may be associated with the binary object, for example, by including the signature in, for example, metadata embedded in the binary object, file properties associated with the binary object and/or a file name or tag of the binary object. The signature may be associated with the binary object when the binary object is created and/or when the binary object is stored in a repository.

The particular processing operations and other network functionality described in conjunction with the flow diagram of FIG. 5 are presented by way of illustrative example only, and should not be construed as limiting the scope of the disclosure in any way. Alternative embodiments can use other types of processing operations for identifying binary objects using a signature of the input items used to create each binary object. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for identifying binary objects using a signature of the input items used to create each binary object. The foregoing applications and associated embodiments should be considered as illustrative only, and numerous other embodiments can be configured using the techniques disclosed herein, in a wide variety of different applications.

It should also be understood that the disclosed techniques for identifying binary objects using a signature of the input items used to create each binary object, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for identifying binary objects using a signature of the input items used to create each binary object may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or a Function-as-a-Service FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based signature-based binary object identification engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based signature-based binary object identification platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
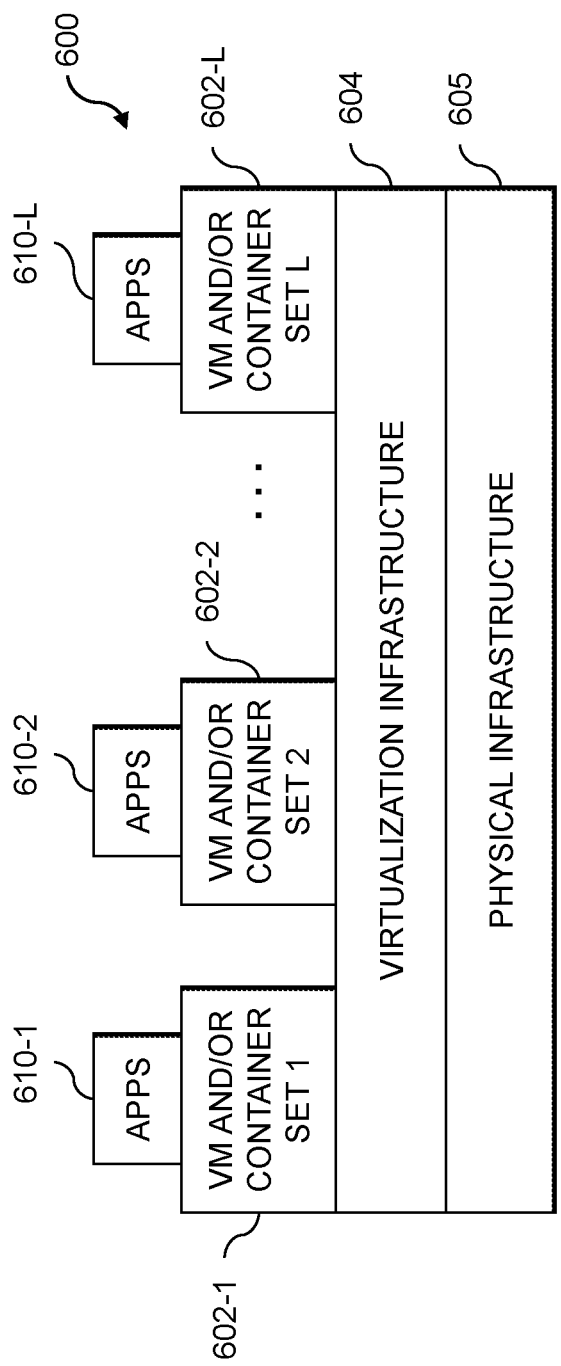
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, ... 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, ... 610-L running on respective ones of the VMs/container sets 602-1, 602-2, ... 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide signature-based binary object identification functionality of the type described above for one or more processes running on a given one of the VMs. For example, each of the VMs can implement signature-based binary object identification control logic and associated functionality for suppressing the generation of binary objects for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide signature-based binary object identification functionality of the type described above for one or more processes running on different ones of the containers. For example, a container host device supporting multiple containers of one or more container sets can implement one or more instances of signature-based binary object identification control logic and associated functionality for suppressing the generation of binary objects.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, ... 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
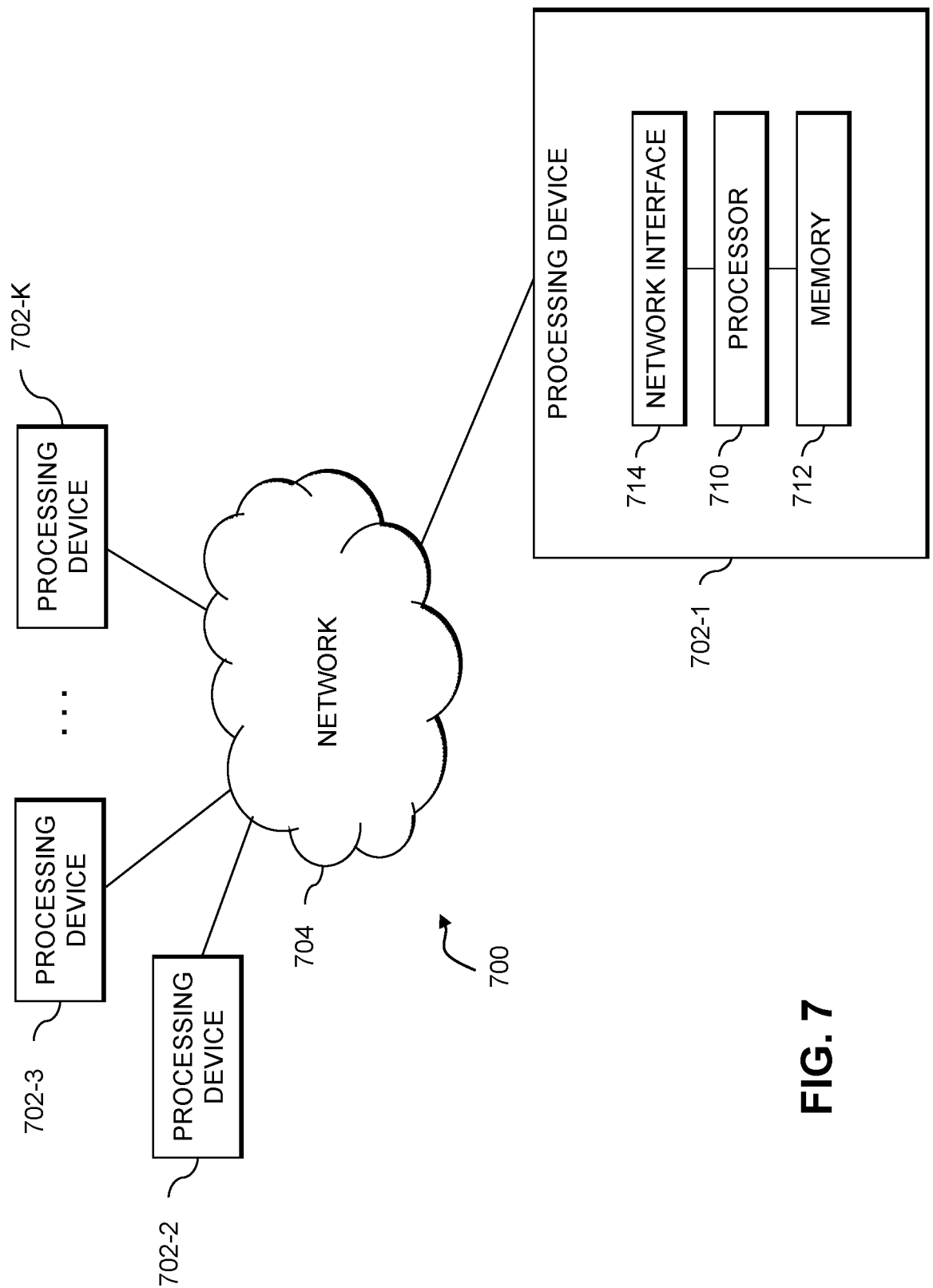
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a plurality of input items for a transformation into a first binary object;
   generating, using at least one processing device, a first signature by applying a function to the plurality of input items;
   determining, using the at least one processing device, whether a second binary object having a second signature that matches the first signature is stored in one or more of a local storage and a repository;
   obtaining the second binary object from the one or more of the local storage and the repository, avoiding performing the transformation of the plurality of input items into the first binary object, in response to determining that the second binary object having the second signature that matches the first signature is stored in the one or more of the local storage and the repository; and
   initiating at least one automated action using the second binary object obtained from the one or more of the local storage and the repository;
   wherein the at least one processing device comprises a processor coupled to a memory.

2. The method of claim 1, performing the following steps, in response to determining that a second binary object having the second signature that matches the first signature is not stored in the one or more of the local storage and the repository:
   transforming the plurality of input items to generate a third binary object;
   associating the first signature with the third binary object; and
   providing the third binary object with the associated first signature to the repository.

3. The method of claim 1, further comprising:
   obtaining one or more additional input items;
   generating an additional signature of the one or more additional input items; and
   comparing the first signature of the plurality of input items to the additional signature of the one or more additional input items to determine whether to transform the one or more additional input items to generate an additional binary object.

4. The method of claim 1, wherein the first signature is associated with the first binary object by including the first signature in one or more of: (i) metadata embedded in the first binary object, (ii) file properties associated with the first binary object, and (iii) one or more of a file name and a tag of the first binary object.

5. The method of claim 1, wherein the first signature is associated with the first binary object one or more of when the first binary object is created and when the first binary object is stored in the repository.

6. The method of claim 1, wherein the first signature comprises one or more of a hash value, a checksum value and an input-dependent value.

7. The method of claim 1, wherein the plurality of input items comprise one or more of source code, at least one parameter and at least one configuration value.

8. The method of claim 2, wherein the transforming the plurality of input items to generate the third binary object comprises generating a first container image using the plurality of input items.

9. An apparatus comprising:
   at least one processing device comprising a processor coupled to a memory;
   the at least one processing device being configured to implement the following steps:
   obtaining a plurality of input items for a transformation into a first binary object;
   generating, using at least one processing device, a first signature by applying a function to the plurality of input items;
   determining, using the at least one processing device, whether a second binary object having a second signature that matches the first signature is stored in one or more of a local storage and a repository;
   obtaining the second binary object from the one or more of the local storage and the repository, avoiding performing the transformation of the plurality of input items into the first binary object, in response to determining that the second binary object having the second signature that matches the first signature is stored in the one or more of the local storage and the repository; and
   initiating at least one automated action using the second binary object obtained from the one or more of the local storage and the repository.

10. The apparatus of claim 9, performing the following steps, in response to determining that a second binary object having the second signature that matches the first signature is not stored in the one or more of the local storage and the repository:
    transforming the plurality of input items to generate a third binary object;
    associating the first signature with the third binary object; and
    providing the third binary object with the associated first signature to the repository, wherein the transforming the plurality of input items to generate the third binary object comprises generating a first container image using the plurality of input items.

11. The apparatus of claim 9, further comprising:
    obtaining one or more additional input items;
    generating an additional signature of the one or more additional input items; and
    comparing the first signature of the plurality of input items to the additional signature of the one or more additional input items to determine whether to transform the one or more additional input items to generate an additional binary object.

12. The apparatus of claim 9, wherein the first signature is associated with the first binary object by including the first signature in one or more of: (i) metadata embedded in the first binary object, (ii) file properties associated with the first binary object, and (iii) one or more of a file name and a tag of the first binary object.

13. The apparatus of claim 9, wherein the first signature is associated with the first binary object one or more of when the first binary object is created and when the first binary object is stored in the repository.

14. The apparatus of claim 9, wherein the plurality of input items comprise one or more of source code, at least one parameter and at least one configuration value.

15. A non-transitory processor-readable storage medium having stored therein program code of one or more software programs, wherein the program code when executed by at least one processing device causes the at least one processing device to perform the following steps:
    obtaining a plurality of input items for a transformation into a first binary object;
    generating, using at least one processing device, a first signature by applying a function to the plurality of input items;

determining, using the at least one processing device, whether a second binary object having a second signature that matches the first signature is stored in one or more of a local storage and a repository;

obtaining the second binary object from the one or more of the local storage and the repository, avoiding performing the transformation of the plurality of input items into the first binary object, in response to determining that the second binary object having the second signature that matches the first signature is stored in the one or more of the local storage and the repository; and initiating at least one automated action using the second binary object obtained from the one or more of the local storage and the repository.

16. The non-transitory processor-readable storage medium of claim 15, performing the following steps, in response to determining that a second binary object having the second signature that matches the first signature is not stored in the one or more of the local storage and the repository:

transforming the plurality of input items to generate a third binary object;

associating the first signature with the third binary object; and providing the third binary object with the associated first signature to the repository, wherein the transforming the plurality of input items to generate the third binary object comprises generating a first container image using the plurality of input items.

17. The non-transitory processor-readable storage medium of claim 15, further comprising:

obtaining one or more additional input items;

generating an additional signature of the one or more additional input items; and comparing the first signature of the plurality of input items to the additional signature of the one or more additional input items to determine whether to transform the one or more additional input items to generate an additional binary object.

18. The non-transitory processor-readable storage medium of claim 15, wherein the first signature is associated with the first binary object by including the first signature in one or more of: (i) metadata embedded in the first binary object, (ii) file properties associated with the first binary object, and (iii) one or more of a file name and a tag of the first binary object.

19. The non-transitory processor-readable storage medium of claim 15, wherein the first signature is associated with the first binary object one or more of when the first binary object is created and when the first binary object is stored in the repository.

20. The non-transitory processor-readable storage medium of claim 15, wherein the plurality of input items comprise one or more of source code, at least one parameter and at least one configuration value.

* * * * *